United States Patent [19]

Itoh et al.

[11] Patent Number: 4,939,591
[45] Date of Patent: Jul. 3, 1990

[54] CONTACT-TYPE IMAGE SENSOR

[75] Inventors: Masataka Itoh, Nara; Atsushi Yoshinouchi, Ohjichohon; Satoshi Nishigaki, Nara; Takashi Nukii, Nara; Shuhei Tsuchimoto, Nara, all of Japan

[73] Assignee: Sharp Kabushiki Kaisha, Osaka, Japan

[21] Appl. No.: 209,882

[22] Filed: Jun. 22, 1988

[30] Foreign Application Priority Data

Jun. 30, 1987 [JP] Japan .................................. 62-165030

[51] Int. Cl.$^5$ .............................................. H04N 1/04
[52] U.S. Cl. ..................................... 358/482; 358/484; 250/578
[58] Field of Search ............... 358/293, 294, 295, 482, 358/484, 213.11; 250/578, 211

[56] References Cited

U.S. PATENT DOCUMENTS 4,419,696 12/1983 Hamano et al. ..................... 358/294

Primary Examiner—Edward L. Coles, Sr.
Attorney, Agent, or Firm—Irell & Manella

[57] ABSTRACT

A contact-type image sensor comprising a light source that illuminates the manuscript to be read; photodetectors that convert the light reflected by the manuscript into an electrical signal; a substrate that is disposed between the photodetectors and the manuscript, a bundle of optical fibers being buried in the substrate; and wiring electrodes that are disposed on the top surface of the substrate corresponding to the light-emitting face of the bundle of optical fibers and that are disposed on the light-receiving surfaces of the photodetectors, wherein the photodetectors are disposed in such a manner that the light-receiving surfaces of the photodetectors face the light-emitting face of the bundle of optical fibers, the wiring electrodes disposed on the photodetectors being electrically bonded to the wiring electrodes disposed on the substrate.

3 Claims, 3 Drawing Sheets

CONTACT-TYPE IMAGE SENSOR

BACKGROUND OF THE INVENTION

1. Field of the Invention

This invention relates to a contact-type image sensor that can be used in a facsimile apparatus, a device for the reading of letters and images, and the like.

2. Description of the Prior Art

As sensors for the reading of images, reduction-type image sensors such as CCD sensors and MOS sensors have been used. However, because the sensing sections of these reduction-type image sensors are small, about 2-4 cm, the reduction of the manuscript has had to be on the order of 1/5 to 1/10, and for that reason, it has been necessary for the length of the light path from the manuscript to the sensing section to be long. Moreover, as the percentage of the reduction of the manuscript increases, the lens aberration becomes a problem influencing the design accuracy of the optical system upon which the overall performance of the apparatus is dependent.

In recent years, contact-type image sensors have been actively developed by which an image with the same size as the manuscript is formed on the lightreceiving surface of the sensing section with the same length as the width of the manuscript via an optical fiber lens array. As photodetectors that are used in such contact-type image sensors, there are those of a thin film-type with CdSSe thin films, amorphous-Si thin films, or the like, and those of a multiplechip-type in which IC sensors such as CCD sensors, bipolar IC sensors, MOS-type sensors, or the like are arranged in a line in the longitudinal direction so that these multiplechips can give the same length as the width of the manuscript. As a replacement for the optical fiber lens arrays for optical systems, there are optical systems in which a sensing section is disposed on one end of a bundle of optical fibers.

FIG. 5 shows a conventional contact-type image sensor with an optical fiber lens array, wherein a light source a illuminates the manuscript b and the reflected light from the manuscript b passes through the optical fiber lens array c, resulting in an image with the same size as the manuscript on a photodetector p. This contact-type image sensor has the following drawbacks:

(1) The conjugate length of the optical fiber lens array c is about 15-40 mm, and it is necessary to have this conjugate length open between the manuscript b and the photodetector p;

(2) Because the focal depth of the optical fiber array c is shallow, the positional adjustment of each part of this optical system in the process for the manufacture of the said contact-type image sensor is necessary;

(3) When bright optical fiber lenses are used for an optical fiber lens array, the aberration of color becomes a problem, and accordingly in cases where color sensors are used, optical fiber lenses that have a long conjugate length but that are dark must be used; and (4) The cost of the optical fiber lens array c is high.

FIG. 6 shows a conventional contact-type image sensor with a bundle of optical fibers, wherein a light source e illuminates the manuscript f, and the reflected light from the manuscript passes through the optical fibers h, which are buried in a conductive substrate g, and arrives at a photodetector i that is disposed on one end of the bundle of optical fibers h. This contact-type image sensor has the following drawbacks:

(1) The light-receiving surface of the photodetector i must be brought into contact with the end of the bundle of optical fibers h in order to prevent light rays from the optical fibers from spreading out and overlapping between the adjacent optical fibers;

(2) When the photodetector i is formed directly on the end of the bundle of optical fibers h, the material for the formation of the photodetector i must be thin films, and moreover the cost of the substrate in which the optical fibers h are buried becomes high; and (3) The number of sensors that can be produced at the same time is limited, which makes the productivity low.

SUMMARY OF THE INVENTION

The contact-type image sensor of this invention, which overcomes the above-discussed and numerous other disadvantages and deficiencies of the prior art, comprises a light source that illuminates the manuscript to be read; photodetectors that convert the light reflected by said manuscript into an electrical signal; a substrate that is disposed between said photodetectors and said manuscript, a bundle of optical fibers being buried in said substrate; and wiring electrodes that are disposed on the top surface of said substrate corresponding to the light-emitting face of said bundle of optical fibers and that are disposed on the light-receiving surfaces of said photodetectors, wherein said photodetectors are disposed in such a manner that the light-receiving surfaces of said photodetectors face the light-emitting face of said bundle of optical fibers, said wiring electrodes disposed on said photodetectors being electrically bonded to said wiring electrodes disposed on said substrate.

In a preferred embodiment, the electrical bonding of the wiring electrodes of said photodetectors to the wiring electrodes of said substrate is carried out by the use of solder bump bonding or tool bonding.

Thus, the invention described herein makes possible the objectives of (1) providing a contact-type image sensor in which an optical path length can be freely set by the use of optical fibers, which results in a miniaturized sensor; (2) providing a contact-type image sensor in which the photodetector and the substrate holding the optical fibers are incorporated into one body, so that the focal adjustment of lenses becomes unnecessary, resulting in an improvement of productivity and a reduction of production cost; and (3) providing a contact-type image sensor in which the distance between the light-receiving surface of each photodetector and the light-emitting face of the bundle of optical fibers can be set as short as possible, resulting in a contact-type image sensor with high resolution.

BRIEF DESCRIPTION OF THE DRAWINGS

This invention may be better understood and its numerous objects and advantages will become apparent to those skilled in the art by reference to the accompanying drawings as follows.

DESCRIPTION OF THE PREFERRED EMBODIMENTS

This invention provides a contact-type image sensor wherein a plurality of photodetectors are disposed in a line in such a manner that the lightreceiving surfaces of the photodetectors face the light-emitting face of a bundle of optical fibers that are buried in a substrate, and wiring electrodes that are disposed on the substrate are bonded to wiring electrodes that are disposed on the light-receiving surfaces of the photodetectors by the use of solder bump bonding or the like. In this way, the distance between the light-emitting face of the bundle of optical fibers and the light-receiving surfaces of the photodetectors can be set at a distance at which a given modulation transfer function (MTF) can be attained.

EXAMPLES

Figure 1:
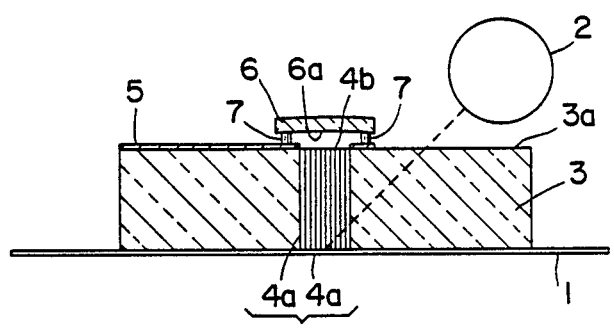
FIG. 1 is a sectional view showing a contact-type image sensor of this invention.
Figure 2:
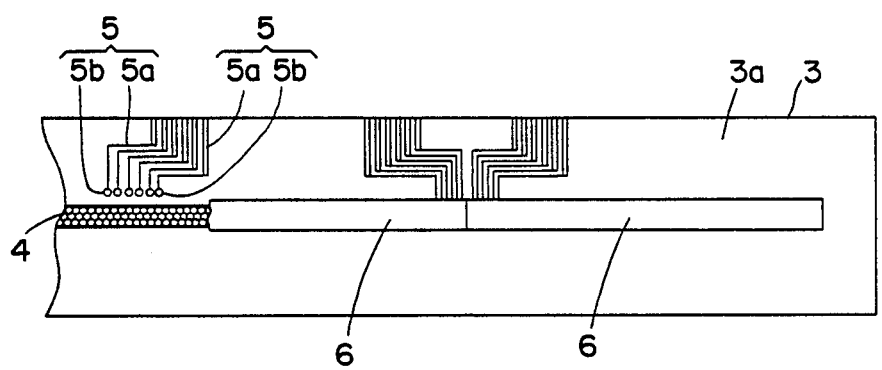
FIG. 2 is a plane view showing the contact-type image sensor shown in FIG. 1.

FIGS. 1 and 2 show a contact-type image sensor of this invention, which comprises a light source 2 that illuminates the manuscript 1 to be read, photodetectors 6 that convert the light reflected by the manuscript 1 into an electrical signal, and an insulating substrate 3 that is disposed between the photodetectors 6 and the manuscript 1. A bundle of optical fibers 4a that constitute an optical fiber array 4 are buried in the substrate 3. Wiring electrodes 5 are disposed on the top surface 3a of the substrate 3. The wiring electrodes 5 on the substrate 3 are bonded to wiring electrodes 8 (FIG. 4) that are disposed on the light-receiving surfaces 6a of the photodetectors 6 by the use of solder bumps 7.

A plurality of photodetectors 6 are arranged in a line over the substrate 3 so that the total length of the photodetectors 6 becomes equal to the width of the manuscript 1 in the longitudinal direction of the substrate 3. Since the wiring electrodes 8 disposed on the light-receiving surfaces 6a of the photodetectors 6 are bonded to the wiring electrodes 5 disposed on the top surface 3a of the substrate 3 by the use of solder bumps 7, there is a slight distance between the lightreceiving surfaces 6a of the photodetectors 6 and the top surface 3a of the substrate 3 (that is, the lightreceiving surfaces 6a of the photodetectors 6 and the light-emitting face of the bundle of optical fibers 4a). If this distance is long, light from one optical fiber and light from the adjacent optical fiber will overlap, causing a decrease in the modulation transfer function (MTF) of the photodetectors 6. Thus, this distance must be set at a distance at which the MTF required can be attained or less.

Figure 3:
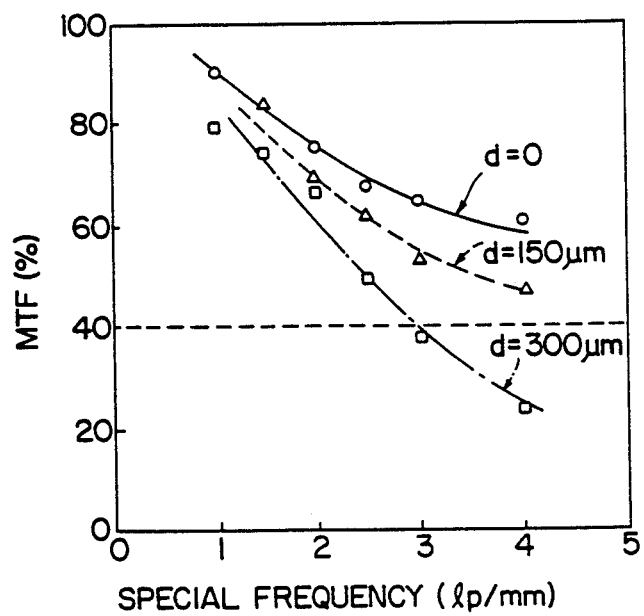
FIG. 3 is of characteristic curves showing the relationship between the distance from the optical fibers to the photodetectors and the modulation transfer function (MTF) of the photodetectors.

FIG. 3 shows the relationship between the distance d from the light-emitting face 4b of the bundle of optical fibers 4a to the light-receiving surfaces 6a of the photodetectors 6 and the MTF of the photodetectors 6, indicating that the MTF abruptly decreases with an increase in the distance d, and accordingly, in order to obtain a MTF of 40% or more at a resolution of 8 dots/mm (i.e., a spacial frequency of 4 lp/mm), the distance d must be set at 150 $\mu$m or less.

Figure 4A:
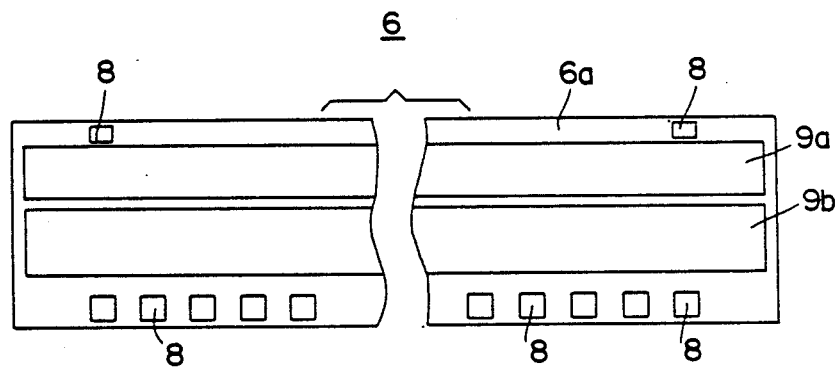
FIGS. 4a and 4b, respectively, are a plane view and a sectional view showing the photodetector used in the contact-type image sensor of FIG. 1.
Figure 4B:
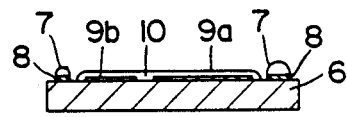
Figure 5:
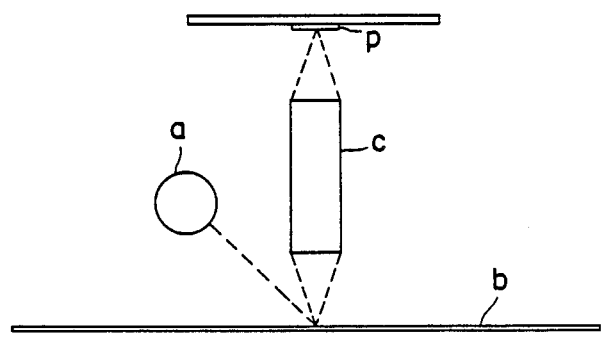
FIGS. 5 and 6, respectively, are schematic diagrams showing conventional contact-type image sensors.
Figure 6:
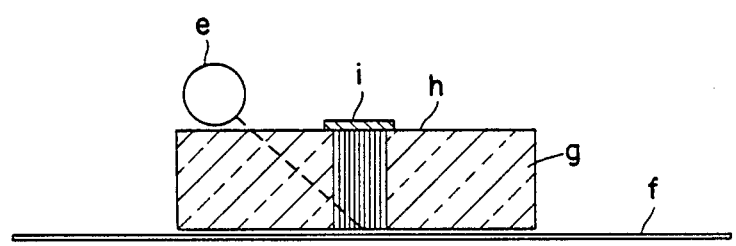

The above-mentioned contact-type image sensor is produced as follows: As the photodetector 6, a CCD sensor with a resolution of 8 dots/mm and a length of about 70 mm shown in FIGS. 4a and 4b is used, wherein on the light-receiving surface 6a of each photodetector 6, in order to prevent a reduction of the resolution at the boundaries among the photodetectors 6, the light-receiving section 9a and the signal-transferring section 9b are formed over the entire area of the light-receiving surface 6a in the longitudinal direction thereof, and moreover a number of wiring electrodes 8 are formed outside of these light-receiving and signal-transferring sections 9a and 9b in the width direction of the light-receiving surface 6a. On the light-receiving surface 6 including the light-receiving section 9a and the light-transferring section 9b, as shown in FIG. 4a, a passivation film 10 of $Si_xN_{1-x}$ $(0<X<1)$ or $SiO_2$ is formed by a thin film formation technique. Solder bumps 7 are formed on the wiring electrodes 8.

The optical fibers 4a are made of quartz glass fibers or multiple-ingredient glass fibers, which are bound into a bundle, resulting in an optical fiber array 4, which is then sandwiched between the halves of the substrate 3 (FIG. 2). Then, on the top surface 3a of the substrate 3, wiring 5a and terminals 5b of the wiring electrodes are made of thin films by the use of a fine processing technique. The terminals 5b contact the solder bumps 7 formed on the photodetectors 6.

The photodetectors 6 are then disposed in a line in such a manner that the light-receiving sections 9a of the photodetectors 6 face the lightemitting face of the bundle of optical fibers 4a, and the wiring electrodes 8 of the photodetectors 6 are bonded to the terminals 5b of the substrate 3 by the reflow bonding method by which the solder bumps 7 are melted by heating it at 180° C.–350° C. in a furnace (FIGS. 1 and 2). In this way, the bonding of the photodetectors 6 to the substrate 3 is carried out for the purposes of a fixation and an electrical connection of the photodetectors 6 to the substrate 3.

The contact-type image sensor obtained by this way has a distance of 50 $\mu$m or less between the light-receiving surfaces 6a of the photodetectors 6 and the light-emitting face 4b of the bundle of optical fibers 4a and exhibits a MTF of 50% or more at a spacial frequency of 4 lp/mm. The above-mentioned production process of this contact-type image sensor makes it easy to adjust the positional deviation between the light-receiving surfaces 6a of the photodetectors 6 and the light-emitting face 4b of the bundle of optical fibers 4a by the use of solder bump bonding that attains the self-alignment effect.

Although the above-mentioned example discloses only a CCD sensor as the photodetector 6, this invention is applicable to IC sensors, thin film sensors, or the like other than the CCD sensor. Moreover, instead of the reflow bonding method by which the self-alignment effect can be attained, the tool bonding method can be also employed. Moreover, instead of the wiring electrodes 8 disposed on both ends of the light-receiving surfaces 6a of the photodetectors 6, terminal electrodes can be formed on one end of the light-receiving surfaces 6a of the photodetectors 6, wherein dummy pads are disposed on the other end of the light-receiving surfaces 6a thereof.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. A contact-type image sensor comprising a light source that illuminates the manuscript to be read; photodetectors that convert the light reflected by said manuscript into an electrical signal; a substrate that is disposed between said photodetectors and said manuscript, a bundle of optical fibers being buried in said substrate; and wiring electrodes that are disposed on the top surface of said substrate corresponding to the light-emitting face of said bundle of optical fibers and that are disposed on the light-receiving surfaces of said photodetectors, wherein said photodetectors are disposed in such a manner that the light-receiving surfaces of said photodetectors face the light-emitting face of said bundle of optical fibers, said wiring electrodes disposed on said photodetectors being directly electrically bonded to said wiring electrodes disposed on said substrate.

2. A contact-type image sensor according to claim 1, wherein said electrical bonding of the wiring electrodes of said photodetectors to the wiring electrodes of said substrate is carried out by the use of solder bump bonding.

3. A contact-type image sensor according to claim 1, wherein said electrical bonding of the wiring electrodes of said photodetectors to the wiring electrodes of said substrate is carried out by the use of tool bonding.

* * * * *